(12) United States Patent
Wightwick et al.

(10) Patent No.: US 7,398,354 B2
(45) Date of Patent: Jul. 8, 2008

(54) ACHIEVING DATA CONSISTENCY WITH POINT-IN-TIME COPY OPERATIONS IN A PARALLEL I/O ENVIRONMENT

(75) Inventors: Glenn R Wightwick, Tucson, AZ (US); Carl E Jones, Tucson, AZ (US); Steven B Wilson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 289 days.

(21) Appl. No.: 11/040,741

(22) Filed: Jan. 21, 2005

(65) Prior Publication Data

US 2006/0168397 A1 Jul. 27, 2006

(51) Int. Cl.
*G06F 12/16* (2006.01)
*G06F 13/00* (2006.01)

(52) U.S. Cl. .................. 711/114; 711/100; 711/154; 711/162

(58) Field of Classification Search ............... 711/161, 711/100, 114, 154, 162, 201, 202, 203, 204
See application file for complete search history.

(56) References Cited

U.S. PATENT DOCUMENTS

| | | | | |
|---|---|---|---|---|
| 5,734,818 A | * | 3/1998 | Kern et al. ............... | 714/20 |
| 5,901,327 A | * | 5/1999 | Ofek ....................... | 710/5 |
| 6,487,561 B1 | * | 11/2002 | Ofek et al. ............... | 707/204 |
| 6,618,794 B1 | * | 9/2003 | Sicola et al. ............. | 711/154 |
| 6,643,671 B2 | * | 11/2003 | Milillo et al. ........... | 707/204 |
| 6,748,504 B2 | * | 6/2004 | Sawdon et al. .......... | 711/162 |
| 6,799,258 B1 | * | 9/2004 | Linde ..................... | 711/162 |
| 6,892,211 B2 | * | 5/2005 | Hitz et al. ............... | 707/202 |
| 6,981,114 B1 | * | 12/2005 | Wu et al. ................. | 711/162 |
| 7,120,767 B2 | * | 10/2006 | Hara et al. .............. | 711/161 |
| 2006/0090050 A1 | * | 4/2006 | Zohar et al. ............. | 711/162 |

\* cited by examiner

*Primary Examiner*—Tuan V. Thai
(74) *Attorney, Agent, or Firm*—Dan Shifrin

(57) ABSTRACT

A method for processing a point-in-time copy of data associated with a logical storage volume where the data to be copied is stored in a striped or parallelized fashion across more than one physical source volume. The method includes receiving a point-in-time copy command concerning a logical volume and distributing the point-in-time copy command in-band to each of the physical source volumes containing a portion of the striped data. The method also includes establishing a point-in-time copy relationship between each physical source volume and one of a corresponding set of multiple physical target volumes. The method further includes copying the data stored on each physical source volume to the corresponding physical target volume. The in-band copy command and the striped data may be distributed over I/O channels between a server and the physical storage and processed sequentially.

3 Claims, 5 Drawing Sheets

ACHIEVING DATA CONSISTENCY WITH POINT-IN-TIME COPY OPERATIONS IN A PARALLEL I/O ENVIRONMENT

TECHNICAL FIELD

The present invention relates to a method, system, and article of manufacture for achieving data consistency in a point-in-time copy in a parallel or striped input/output (I/O) environment by using an in-band command.

BACKGROUND ART

Information technology systems, including storage systems, may need protection from site disasters or outages, where outages may be planned or unplanned. Furthermore, information technology systems may require features for data migration, data backup, or data duplication. Implementations for disaster or outage recovery, data migration, data backup, and data duplication may include mirroring or copying of data in storage systems. Such mirroring or copying of data may involve interactions among hosts, storage systems and connecting networking components of the information technology system.

A storage server, such as the IBM® TotalStorage® Enterprise Storage Server® ("ESS"), may be a disk storage server that includes one or more processors coupled to storage devices, including high capacity scalable storage devices, Redundant Arrays of Inexpensive (or Independent) Disks ("RAID"), etc. The enterprise storage servers are connected to a network and include features for copying data in storage systems.

One type of copy strategy frequently employed in backup or disaster recovery systems is a point-in-time copy. Generally, a point-in-time copy includes copying some or all of the contents of a source logical storage volume to a target logical volume at a select point in time. Typically, only minimal interruption of normal read and write I/O operations from a host system to the source or target logical volumes are necessary when a point-in-time copy is invoked. Thus, one of the many benefits of point-in-time copy operations is rapid storage volume availability for any application running on the host after a point-in-time copy has been requested.

Many point-in-time copy systems work at the logical volume level. Other point-in-time copy systems can be used for data set copies as well as volume copies. In more fundamental point-in-time copy implementations, the source and target volumes must be in the same storage server logical subsystem and only a single source and target volume may be involved in one point-in-time copy relationship at a time. In more sophisticated point-in-time copy implementations, the source and target volumes may be on different logical storage subsystems, multiple point-in-time copy relationships may be allowed, and incremental point-in-time copies may be possible.

Many point-in-time copy implementations employ a technique known as data striping or data parallelization. Although a point-in-time copy operation may involve a single logical source volume and a single logical target volume, the data contained within these logical volumes may be physically stored on several separate disk drives or several different physical storage volumes. This technique for spreading the data in a logical volume across several physical volumes or disks is known as striping or parallelization. Striping can be advantageous because the I/O capacity of the physical volumes may be used in parallel to access the data on the logical volume. Thus, striping can be employed to achieve high performance reading and writing of large files with certain benefits for random access.

A fundamental requirement of a successful point-in-time copy is that the logical target volume(s) represent the state of data storage on the logical source volume at a specific point in time. However, point-in-time copy operations are not instantaneous. Furthermore, point-in-time copy operations across multiple physical drives containing portions of data from a logical volume may not occur on each physical drive at precisely the same time. In addition, one or more of the physical drives involved in a source and target pair may be receiving host I/O as a point-in-time copy completes on another physical drive in the striped logical volume, thus leading to data loss or data corruption issues.

The present invention is directed toward overcoming one or more of the problems discussed above.

SUMMARY OF THE INVENTION

The need in the art is met by a method for processing a point-in-time copy of data associated with a logical storage volume where the data to be copied is stored in a striped or parallelized fashion across more than one physical source volume. The method includes receiving a point-in-time copy command concerning a logical volume and distributing the point-in-time copy command in-band to each of the physical source volumes containing a portion of the striped data. The method also includes establishing a point-in-time copy relationship between each physical source volume and one of a corresponding set of multiple physical target volumes. The method further includes copying the data stored on each physical source volume to the corresponding physical target volume.

The method may further include receiving an update to the data associated with the logical volume after the point-in-time copy relationship between each physical source volume and corresponding physical target volume has been established, parallelizing the update, and distributing the update to each physical source volume. Subsequently, the update may be written to each physical source volume after the data stored on that physical source volume has been copied to the corresponding physical target volume.

Preferably, the point-in-time copy command will be distributed to each physical source volume over I/O channels maintained between a storage controller and the physical source volumes. Thus, the point-in-time copy command will be distributed to each physical source volume in-band. In addition, any update which is striped to the physical source volumes may also be distributed over the same I/O channels. The point-in-time copy command so distributed and any subsequent update shall be processed sequentially, assuring the integrity of the copied data.

Although described above with respect to a method, the need in the art may also be met with an apparatus for processing a point-in-time copy, an article of manufacture containing instructions for processing a point-in-time copy, or a method for deploying computing infrastructure comprising integrating computer readable code into a computing system for processing a point-in-time copy.

DETAILED DESCRIPTION OF THE PREFERRED EMBODIMENT

Figure 1:
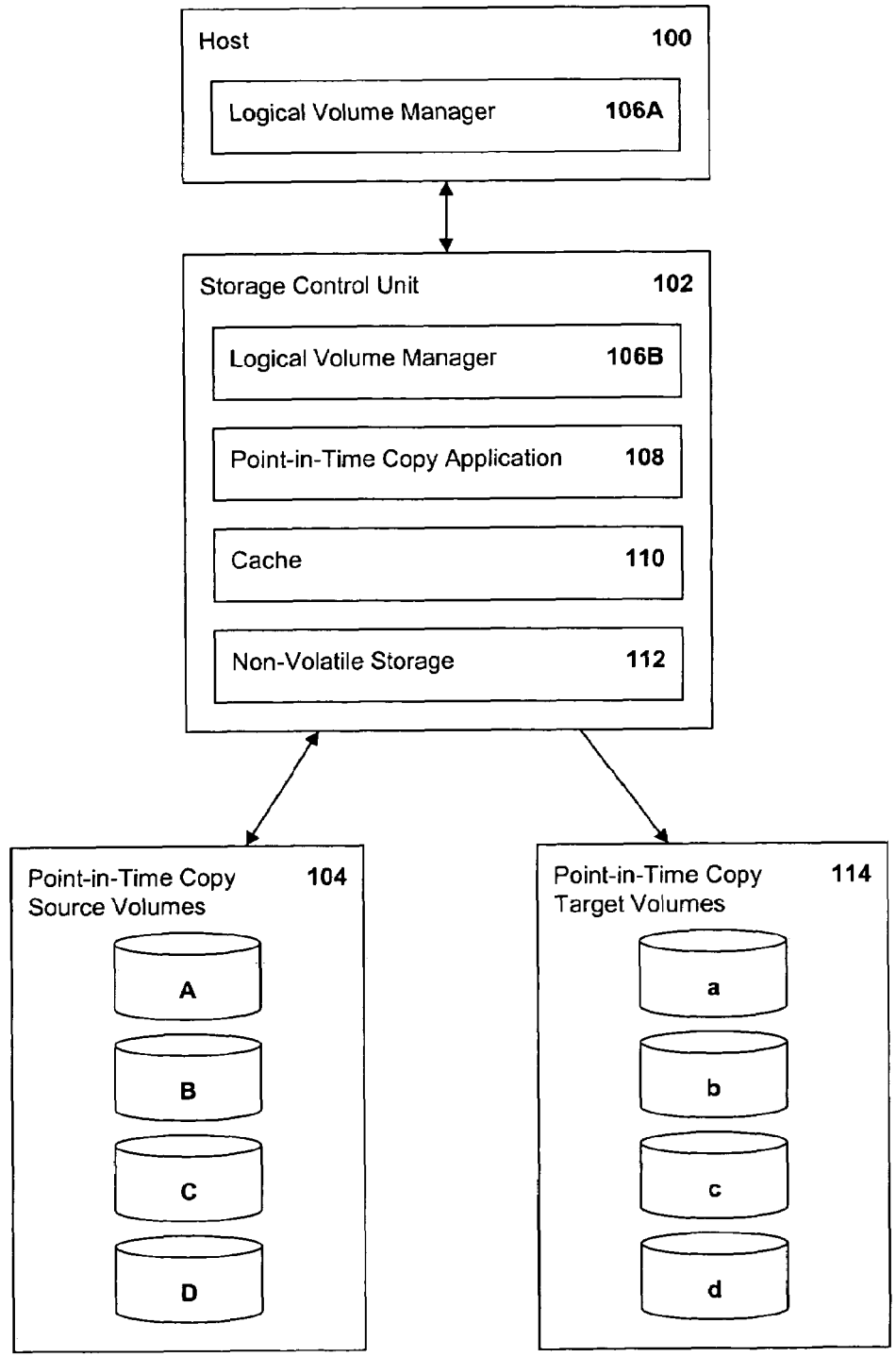
FIG. 1 is a block diagram of a data storage environment in which aspects of the present invention may be implemented.

FIG. 1 illustrates a data processing environment in which an application running on a host 100 system sends an I/O request to a storage control unit 102. The storage control unit 102 periodically stores or writes data to physical storage volumes which are shown in FIG. 1 as point-in-time copy source volumes 104.

The data written or stored to the point-in-time copy source volumes 104 may be striped or parallelized. Striping is a technique for spreading the data in a logical volume across several physical drives or physical storage volumes in such a way that the I/O capacity of the physical drives can be used in parallel to access data on the logical volume. The primary objective of striping is very high performance reading and writing of files, particularly large files. Striping also provides benefits for random access. The parallelization and placement of data on the individual physical storage volumes 104A, 104B, 104C, 104D is controlled by a logical volume manager 106A, 106B. The logical volume manager is typically associated with the host 100, but may be associated with the storage control unit 102, or both.

A point-in-time copy of a logical volume or series of logical volumes may be specifically invoked by a command issued by the host 100 or through a storage control unit 102 interface. Alternatively, scheduled point-in-time copies may be made at select time intervals absent commands terminating a point-in-time copy program.

The point-in-time copy operations are managed by a point-in-time copy application 108 associated with the storage control unit 102. Typically, point-in-time copy operations involve two phases. The first phase is an establish phase where metadata is copied from the point-in-time copy source volumes and stored in a cache 110 or non-volatile storage 112 associated with the storage control unit 102. The second phase of a typical point-in-time copy operation is a copy phase where the metadata created during the establish phase is copied to physical point-in-time copy target volumes 114. Typically, both the physical source volumes 104 and the physical target volumes 114 are available for unrelated I/O writes and reads as soon as the establish phase has completed. Overall storage availability is significantly increased because the copy phase can complete later as a background operation.

A problem can arise when performing a point-in-time copy of data on physical volumes such as the point-in-time copy source volumes 104A, 104B, 104C, 104D, across which data has been striped.

Figure 2:
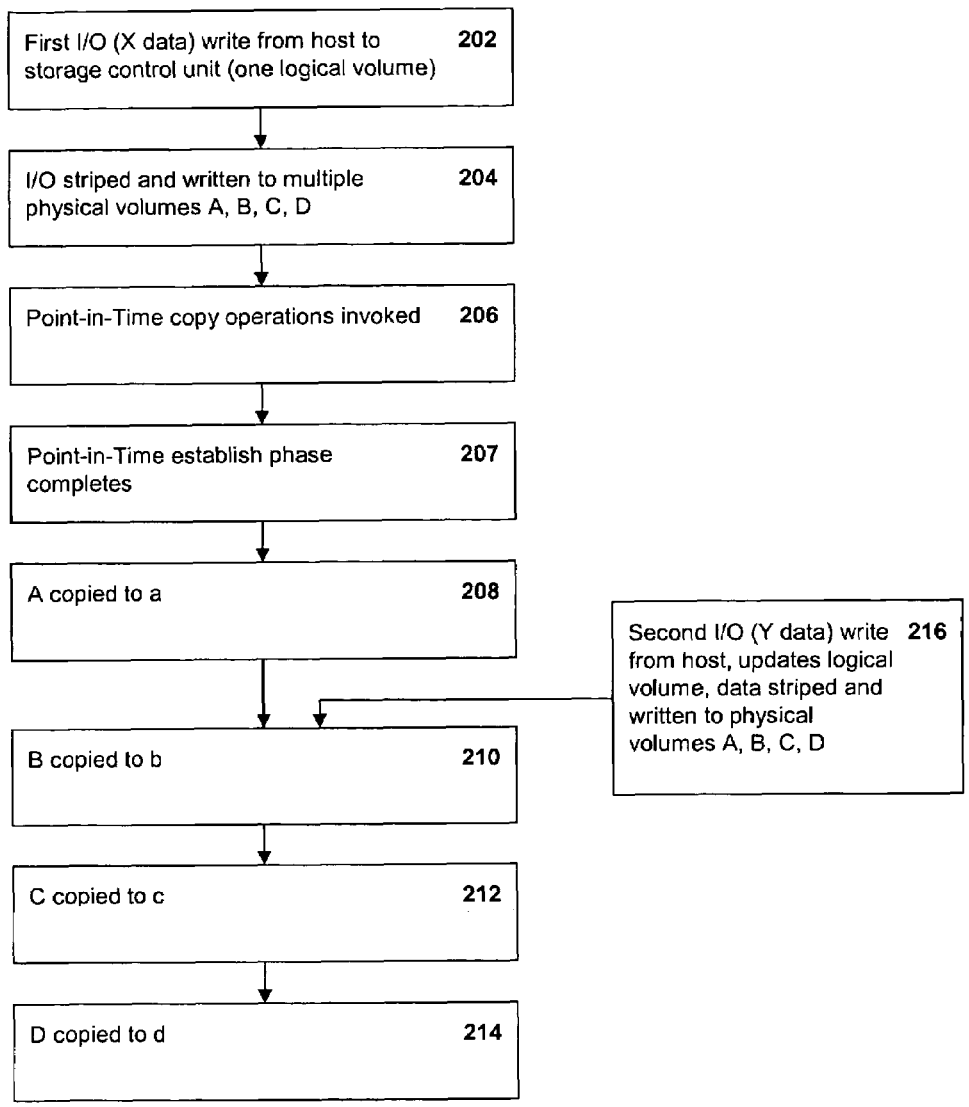
FIG. 2 is a flowchart illustrating a point-in-time copy operation which does not feature parallelization and in-band transmission of a copy command, and which can result in data inconsistency.
Figure 3:
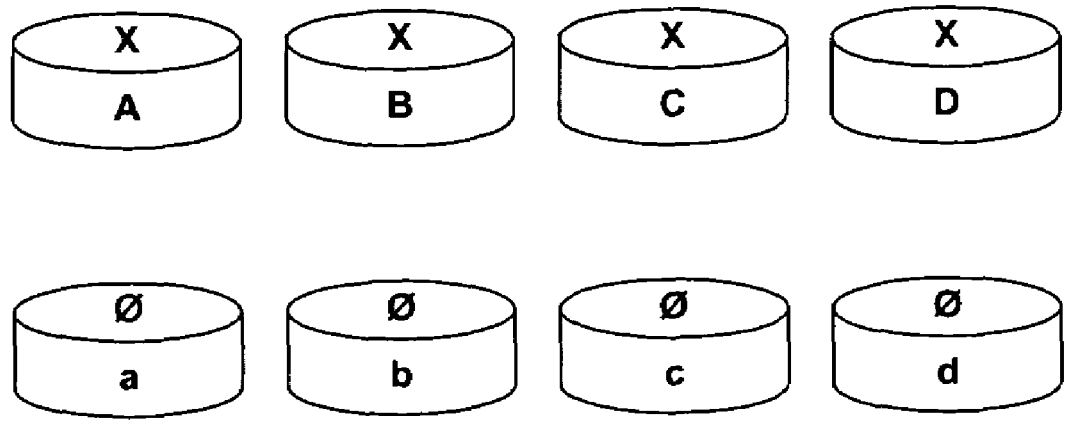
FIG. 3 is a block diagram illustrating the status of physical source and target volumes prior to the issuance of a point-in-time copy command.

The problem with the point-in-time copy of striped data can be illustrated by reference to FIG. 2. Prior to a point-in-time copy operation, a first I/O data write may be made from the host 100 to the storage control unit 102 (step 202). This I/O from the host 100 contains data referred to below as the "X data" set. The X data is written to a single logical volume, however, the logical volume manager 106 stripes the data to multiple physical volumes 104A, 104B, 104C, 104D for storage (step 204). Upon completion of the write of the X data to physical volumes 104A, 104B, 104C, 104D, each of the physical volumes 104A, 104B, 104C, 104D contains X data as is graphically depicted in FIG. 3. At the point in time graphically depicted in FIG. 3, the physical target volumes 114a, 114b, 114c, 114d do not contain a point-in-time consistent copy of the data in the physical source volumes 104A, 104B, 104C, 104D.

Subsequent to the write of the X data, point-in-time copy operations are invoked (step 206). As discussed above, a typical point-in-time copy operation involves two phases, an establish phase and a copy phase. After the establish phase has been completed (step 207), both the physical source volumes 104 and physical target volumes 114 are available for unrelated I/O. The establish phase takes a relatively short period of time. Data integrity problems can arise, however, because the copy phase of the point-in-time copy operation takes a relatively longer period of time and typically the copying of multiple physical volumes (such as 104A, 104B, 104C, 104D) proceeds sequentially.

When the copy phase of the point-in-time copy operation commences in the background, physical source volume 104A may be copied to physical target volume 114a (step 208). Subsequently, physical source volume 104B may be copied to physical target volume 114b (step 210). Similarly, physical source volume 104C and physical source volume 104D may be copied to the appropriate target volumes (114c and 114d, respectively) (steps 212, 214). As mentioned above, however, the physical source volumes 104 and physical target volumes 114 are available for unrelated I/O during these copy phase steps (steps 208-214). As shown in FIG. 2, a second I/O write concerning what is referred to herein as the "Y data" set may be applied to the relevant logical volume while the copy phase of the point-in-time copy operation is completing. As shown in FIG. 2, the second I/O write to the logical volume is also striped and written to the physical volumes 104A, 104B, 104C, 104D (step 216).

Figure 4:
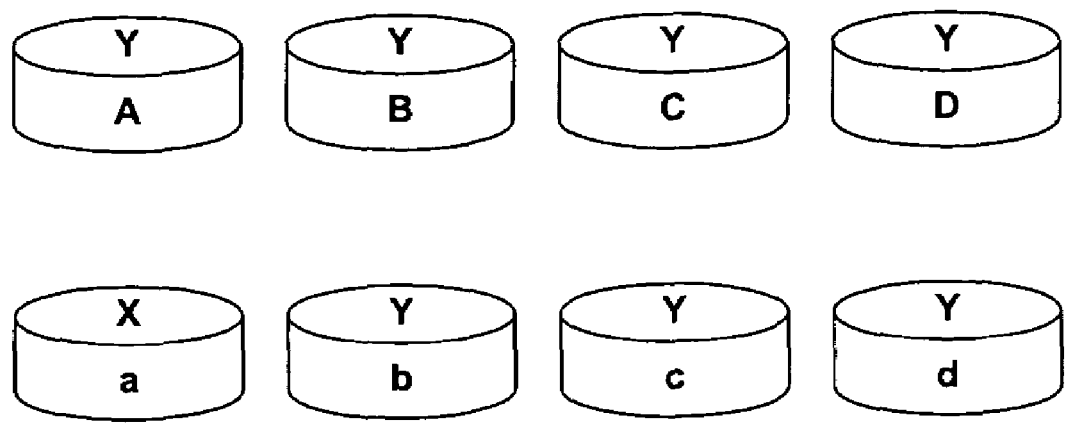
FIG. 4 is a block diagram illustrating the status of physical source and target volumes after the issuance and execution of a non-parallelized, out of band, point-in-time copy command resulting in data inconsistency.

The Y data write may occur, for example, in between the establishment of the copying of physical volumes 104A and 104B. Physical volume copies occurring after the write of the Y data (steps 210-214) will include the Y data. However, physical volume copies occurring before the Y data write (step 208) will not include the Y data. Thus, the data stored on the physical source volumes 104 and physical target volumes 114 upon completion of the point-in-time copy operation commenced in step 206 will be as reflected in FIG. 4. The updated data of the Y data set will have been written to physical source volumes 104A, 104B, 104C, 104D and copied to physical target volumes 114b, 114c, 114d, however, the point-in-time copy on the physical target volume 114a contains an error since the Y data was the data desired on 114a at the time the point-in-time copy was invoked.

This error can be corrected by using an in-band copy command. In band commands are typically commands transmitted from the storage control unit 102 to the physical storage 104, 114 among or within various I/O reads and writes. The point-in-time copy inconsistency described with respect to FIG. 2 and illustrated in FIG. 4 can be avoided by inserting an in-band command into the I/O stream prior to the point of I/O parallelization. Thus, the logical volume manager 106 can stripe the in-band command to each physical source volume 104A, 104B, 104C, 104D in a similar manner as the I/O data is striped. This approach, as described in detail below, can guarantee consistency of the point-in-time copy across all physical target volumes 114a, 114b, 114c, 114d and works even for volumes that are in separate storage subsystems.

Figure 5:
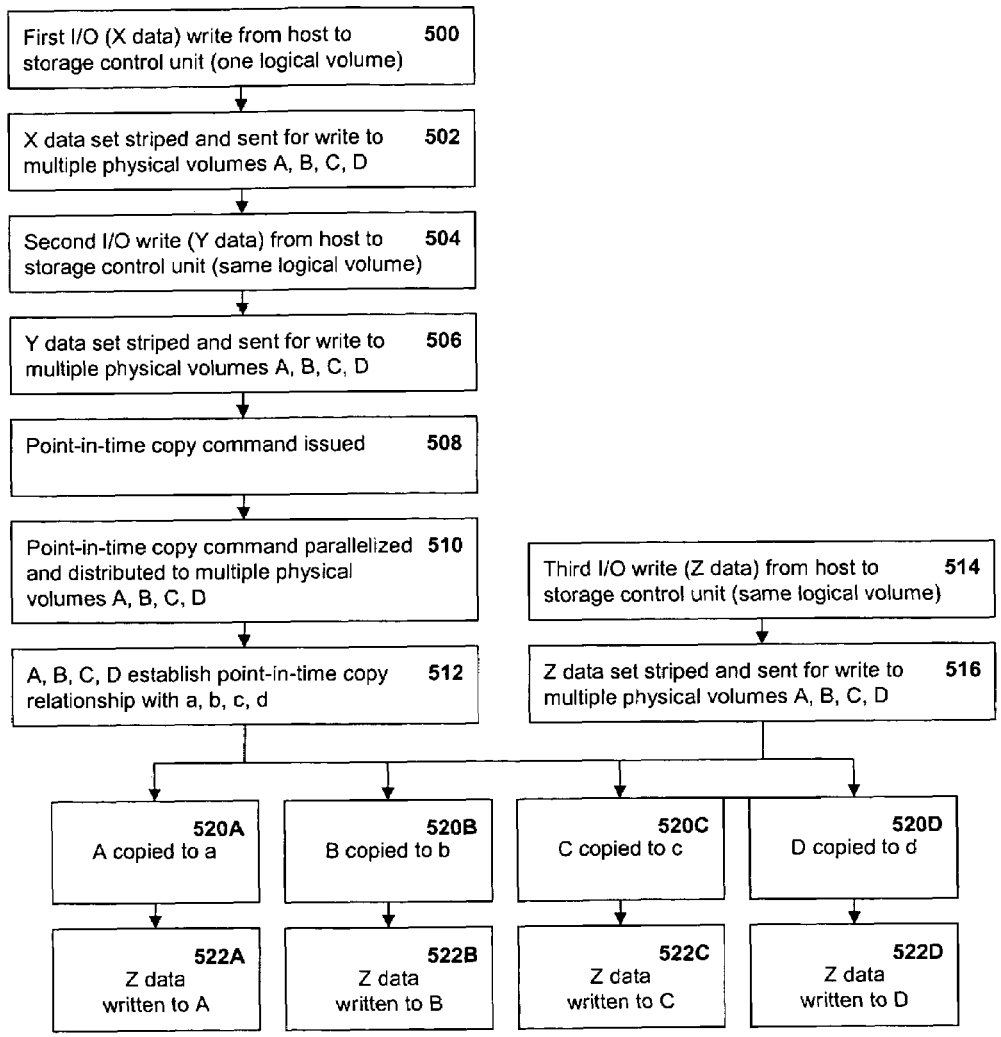
FIG. 5 is a flowchart illustrating logic in accordance with certain described implementations of the invention, in particular parallelization and in-band distribution of a point-in-time copy command.

Consistency of point-in-time copy data in a parallel I/O environment may thus be assured by targeting a point-in-time copy command to the logical volume manager 106 that parallelizes I/O across the various physical source volumes 104A, 104B, 104C, 104D. These volumes may be contained in a single storage subsystem or they may be distributed across a number of storage subsystems. As shown in FIG. 5, the point-in-time copy command may be parallelized and distributed along with typical read or write I/O operations. In addition, the point-in-time copy command is preferably sent via the same I/O channels across which read and write I/O operations are distributed.

Figure 6:
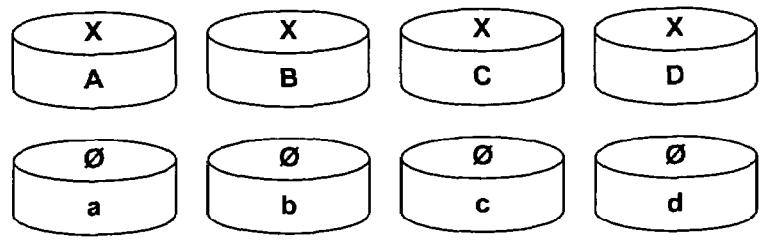
FIG. 6 is a block diagram illustrating the status of physical source and target volumes prior to the issuance of a point-in-time copy command.

Referring to FIG. 5, the process for maintaining consistency in parallel environment point-in-time copies commences with a first I/O write from the host 100 to the storage control unit 102 concerning a logical volume (step 500). This first I/O write contains what is referred to herein as the "X data" set. Upon receipt, the X data set is striped and sent over the I/O channels for storage to multiple physical source volumes 104A, 104B, 104C, 104D. At this point in time, the physical source volumes 104A, 104B, 104C, 104D contain X data as shown in FIG. 6 and the physical target volumes 114a, 114b, 114c, 114d, which will subsequently be established in a point-in-time copy relationship, contain no data or unrelated data.

Referring back to FIG. 5, I/O operations continue with an update of a Y data set sent from the host 100 to the storage control unit 102 concerning the same logical volume (step 504). This update is similarly striped by the logical volume manager 106 and transmitted over the I/O channels for storage to the physical source volumes 104A, 104B, 104C, 104D (step 506). At this point in time, no point-in-time copy command has been transmitted, so the status of the storage volumes is as is reflected in FIG. 7 with volumes 104A, 104B, 104C, 104D containing the Y data set and physical volumes 114a, 114b, 114c, 114d containing no data or unrelated data.

Figure 7:
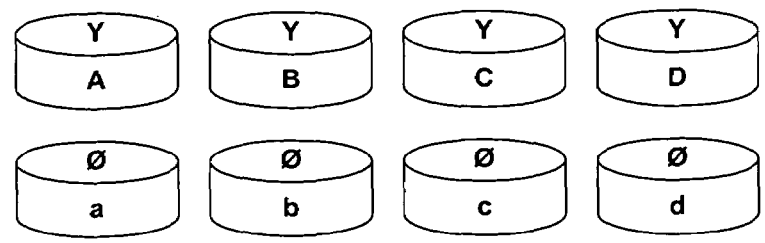
FIG. 7 is a block diagram illustrating the status of physical source and target volumes prior to the issuance of a point-in-time copy command, but after receipt of a data update.

At this point in time, an election is actively or automatically made to create a point-in-time copy of the data on the physical source volumes 104. As shown in FIG. 7, these volumes contain the Y data set at the select point in time. Accordingly, a point-in-time copy command is issued concerning the logical volume (step 508).

The point-in-time copy command is targeted to the logical volume manager 106, parallelized and distributed from the storage control unit 102 to physical source volumes 104A, 104B, 104C, 104D (step 510). Preferably, the parallelized point-in-time copy command is distributed to each physical volume 104A, 104B, 104C, 104D via normal I/O channels. Upon receipt of the point-in-time copy command, each physical source volume 104A, 104B, 104C, 104D establishes a point-in-time copy relationship with the appropriate physical target volume 114a, 114b, 114c, 114d (step 512). As described above, upon completion of the establishment phase, the logical storage volume is available for subsequent I/O operations.

Figure 8:
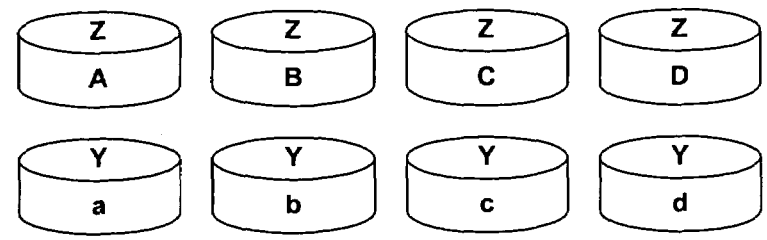
FIG. 8 is a block diagram illustrating the status of physical source and target volumes after the issuance and execution of a point-in-time copy command showing data consistency resulting from the parallelization and in-band distribution of the point-in-time copy command.

Subsequently, a third I/O write from the host 100 to the storage control unit 102 concerning the logical volume may be made (step 514). This update shall be described herein as concerning the "Z data" set. Upon receipt, the logical volume manager 106 will stripe the Z data set and send the data to physical source volumes 104A, 104B, 104C, 104D for storage (step 516). The data will be sent over the I/O channels to each physical underlying volume. The Z data set is sent for storage after the establishment of the point-in-time copy relationship of step 510, but may be sent at any time during the copy phase. Since the point-in-time copy command was parallelized and sent individually through the I/O channels to each of the physical source volumes 104, copy inconsistency may be avoided. Each physical volume 104, in due course, performs a copy operation copying its contents to the target volumes 114 (steps 520A, 520B, 520C, 520D). In no individual case will the Z data be written to a given physical source volume 104A, 104B, 104C, 104D prior to the time the existing contents of a physical source volume 104A, 104B, 104C, 104D are copied, since the striped copy command and striped I/O commands are distributed over the same I/O channels (in-band) and are processed sequentially. Upon completion of the copy phase for a given physical source volume 104A, 104B, 104C, 104D, the Z data set may be written for that source volume 104 (steps 522A, 522B, 522C, 522D). Completion of steps 520 and 522 for each physical source volume 104A, 104B, 104C, 104D results in the source volumes 104 containing the Z data set and the target volumes 114 containing the Y data set as shown in FIG. 8. Thus, the target volumes 114 may be used to revert the system to the point in time when the copy was invoked (step 508).

I/O operations are processed sequentially by the storage subsystems against each physical volume in the order that they are received. Thus, the resulting point-in-time copies of the striped physical source volumes 104 will remain consistent across the target volumes 114 when all point-in-time copy commands have completed no matter what order the individual point-in-time copy operations were completed against each volume.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies regardless of the particular type of signal bearing media actually used to carry out the distribution. Examples of computer readable media include recordable-type media such as a floppy disk, a hard disk drive, a RAM, and CD-ROMs and transmission-type media such as digital and analog communication links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of processing a point-in-time copy of data associated with a logical storage volume, the method comprising:

receiving first data associated with a logical volume;

sending the first data over I/O channels in a striped fashion for storage across more than one physical source volume;

storing the first data on the more than one physical source volume;

receiving a first point-in-time copy command concerning the first data;

distributing the first point-in-time copy command over the I/O channels to each of the physical source volumes;

establishing a point-in-time copy relationship between each physical source volume and a corresponding one of a set of more than one physical target volumes;

receiving second data associated with the logical volume to update the first data;

sending the second data over the I/O channels in a striped fashion for storage across the more than one physical source volume;

executing the distributed first point-in-time copy command by copying the first data stored on each physical source volume to the corresponding physical target volume; and storing the second data on a physical source volume after the first data has been copied to the corresponding physical target volume.

2. The method of claim 1, wherein the I/O channels comprise in-band I/O channels maintained between a storage controller and the physical source volumes and across which read and write I/O operations are distributed.

3. The method of claim 1 further comprising:

receiving multiple updates to the first data associated with the logical volume;

receiving multiple point-in-time copy commands concerning the multiple updates, with the multiple point-in-time copy commands and multiple updates being received in a sequence;

parallelizing the updates;

distributing the updates to each of the physical source volumes;

distributing the point-in-time copy commands to each of the physical source volumes; and writing the updates to each physical source volume and executing the point-in-time copy commands with respect to each physical source volume in accordance with the sequence, whereby an update is stored to a physical source volume only after a previous update is copied from the physical source volume to the corresponding physical target volume.

* * * * *